United States Patent [19]

Mercer et al.

[11] Patent Number: 5,232,151
[45] Date of Patent: Aug. 3, 1993

[54] COLD ZONE HEAT REGULATION DEVICE AND METHOD FOR A DEEP FAT FRYER

[75] Inventors: Gary L. Mercer, Eaton; Robert W. Stirling, Englewood, both of Ohio

[73] Assignee: Henny Penny Corporation, Eaton, Ohio

[21] Appl. No.: 815,526

[22] Filed: Jan. 2, 1992

[51] Int. Cl.⁵ .............................................. A47J 37/12
[52] U.S. Cl. .............................. 236/20 R; 236/78 B; 99/403; 219/441
[58] Field of Search ............ 236/78 B, 20 R; 99/403; 219/441, 516; 392/454

[56] References Cited

U.S. PATENT DOCUMENTS

| | | | |
|---|---|---|---|
| 1,990,351 | 2/1935 | Shroyer | 236/20 R X |
| 2,994,760 | 8/1961 | Pecdraro et al. | 219/398 X |
| 3,159,344 | 12/1964 | Wilson | 236/20 |
| 5,103,801 | 4/1992 | Herring et al. | 219/441 |

Primary Examiner—William E. Wayner
Attorney, Agent, or Firm—Baker & Botts

[57] ABSTRACT

A computerized control system for use in a deep fat fryer is provided for controlling a heating device and a temperature probe added to the deep fat fryer whereby both the heating device and temperature probe are located in proximity to the bottom zone of the cooking vessel of the fryer. The computerized control system thereafter regulates the temperature of the portion of the cooking substance located in proximity to the bottom zone of the vessel to a predetermined target temperature range. By doing so, moisture found within any cracklings located within the bottom zone of the vessel is minimized and the cooking substance therefore will not boil over the sides of the vessel.

16 Claims, 3 Drawing Sheets

COLD ZONE HEAT REGULATION DEVICE AND METHOD FOR A DEEP FAT FRYER

BACKGROUND OF THE INVENTION

1. Field of the Invention

This invention is directed generally to a heat regulation device and more specifically to a heat regulation device for use with cooking systems, such as a deep fat fryer, for regulating the temperature of a cold zone of the fryer so as to eliminate the potential boiling of a cooking substance within the fryer.

2. Description of the Prior Art

In the past, many types of large capacity pressurized deep fat fryer cookers (referred herein as deep fat fryers, cooking devices, cookers, etc.) have been devised for cooking products in a heated and/or pressurized environment. For example, U.S. Pat. No. 5,033,368, issued to Brewer and commonly assigned to the present assignee, discloses a large capacity gas fired pressure cooker heated by a pair of radiant burner units utilizing a gas/air mixture. Similarly, such a cooking device has been disclosed in U.S. Pat. No. 4,913,038, issued to Burkett et al. and also commonly assigned to the present assignee, which utilizes electric heating devices.

Typically, such cooking devices comprise a cooking vessel, which may be filled with a type of cooking substance (e.g., oil or shortening), and heating devices surrounding or immersed in the vessel for heating the cooking oil. Products to be cooked are placed in the vessel, either directly or possibly contained within a wire basket, and are cooked for a desired length of time. A process controller coupled to the cooking device may be present for controlling the operation of the heating devices according to a predetermined protocol, or the heating devices may be controlled by an electromechanical device. Also, a lid which may be sealed to the top of the device may be utilized in order to cook the products both heat and pressure.

While such cooking devices described above, and further described in the above U.S. patents and in the prior art, provide for a relatively effective cooking environment, a problem exists with these devices. Specifically, the cooking substance (e.g. shortening) used in these cooking devices has the potential to boil over the sides of the cooking vessel at certain times. It has been discovered that this problem is directly linked to the amount of moisture contained within the "cracklings" found within the colder zones of the cooking substance usually found at the bottom of the vessel.

Generally, "cracklings" are pieces of breading, skin or other items which have dropped off of a food item being cooked in the fryer. For example, if fried chicken pieces are being cooked within the vessel, some of the breading applied before cooking the chicken may break away from the chicken and drift to the lower zone of the vessel. Because moisture may be found within the cracklings, such moisture may cause the cooking substance to boil over if the cracklings become mixed with the hot oil in the upper zone of the vessel.

Therefore, the present invention is directed to a device and method for preventing such boiling over to take place by regulating the temperature found within the cold zone of a fryer. This and other aspects of the present invention will be described in further detail below.

SUMMARY OF THE INVENTION

In order to overcome this and other deficiencies of the prior art, it is an object of the present invention to provide a computer controlled deep fat fryer capable of regulating the temperature within a cooking vessel of the fryer.

Specifically, it is an object of the present invention to provide an additional temperature probe and heating device to a cooking vessel of a deep fat fryer, along with the necessary control functionality, to regulate the temperature within one zone of the vessel.

It is a further object of the present invention to provide an additional temperature probe and heating device to a zone of a vessel of a deep fat fryer previously known to operate at a lower temperature than the remaining zone of the vessel, along with the necessary control functionality, to maintain constant temperatures within the vessel.

It is a further object of the present invention to prevent the boiling over of a cooking substance within a deep fat fryer.

It is a further object of the present invention to maintain a zone of a vessel of a deep fat fryer previously known to operate at a lower temperature than the remaining zone of the vessel so as to prevent the boiling over of a cooking substance within the vessel.

It is a further object of the present invention to eliminate moisture within pieces of a product which have broken off from the product (cracklings) while cooking within a deep fat fryer.

It is a further object of the present invention to prevent the boiling over of a cooking substance within a vessel of a deep fat fryer by eliminating moisture within cracklings found within a zone of the vessel which operates at a lower temperature than the remaining zone of the vessel.

In order to achieve these and other objects of the present invention, there is provided a computerized control system for controlling a heating device added to a deep fat fryer, in addition to a standard heating device. The control system controls the temperature of a zone (a "cold zone") within the vessel of the deep fat fryer which operates at a lower temperature than the remaining portion of the vessel (a "warm zone"). The computerized control system controls the added heating device responsive to a temperature probe added to the fryer in proximity to the cold zone. The added temperature probe operates in addition to and independently from a standard temperature probe used for measuring the overall temperature within the vessel.

Specifically, there is provided a computerized control system for use in a deep fat fryer for controlling a heating device and a temperature prove added to the deep fat fryer whereby both the heating device and temperature probe are located in proximity to the bottom zone of the cooking vessel of the fryer. The computerized control system thereafter regulates the temperature of the portion of the cooking substance located in proximity to the bottom zone of the vessel to a predetermined target temperature range. By doing so, moisture found within any cracklings located within the bottom zone of the vessel is minimized and the cooking substance therefore will not boil over the sides of the vessel.

DETAILED DESCRIPTION

The present invention is generally directed to control systems and is specifically directed to a control system for controlling the operation of a deep fat fryer. In order to understand the detail description of the invention to follow, it is important to understand the terminology used. As used herein, the terms cooking vessel, vessel and pot may be used interchangeably. In addition, the terms selected temperature, target temperature, set temperature and set point temperature may refer to the same selectable temperature. Also, the terms cooking substance, cooking medium, shortening and fat may be used interchangeably.

Figure 1A:
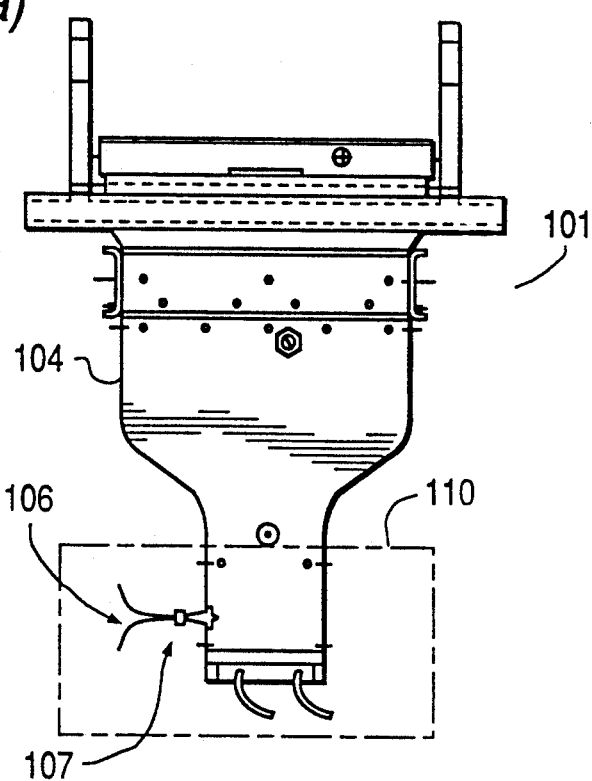
FIGS. 1(a) and 1(b) show front and side views of the cooking vessel of a fryer used in accordance with the present invention.
Figure 1B:
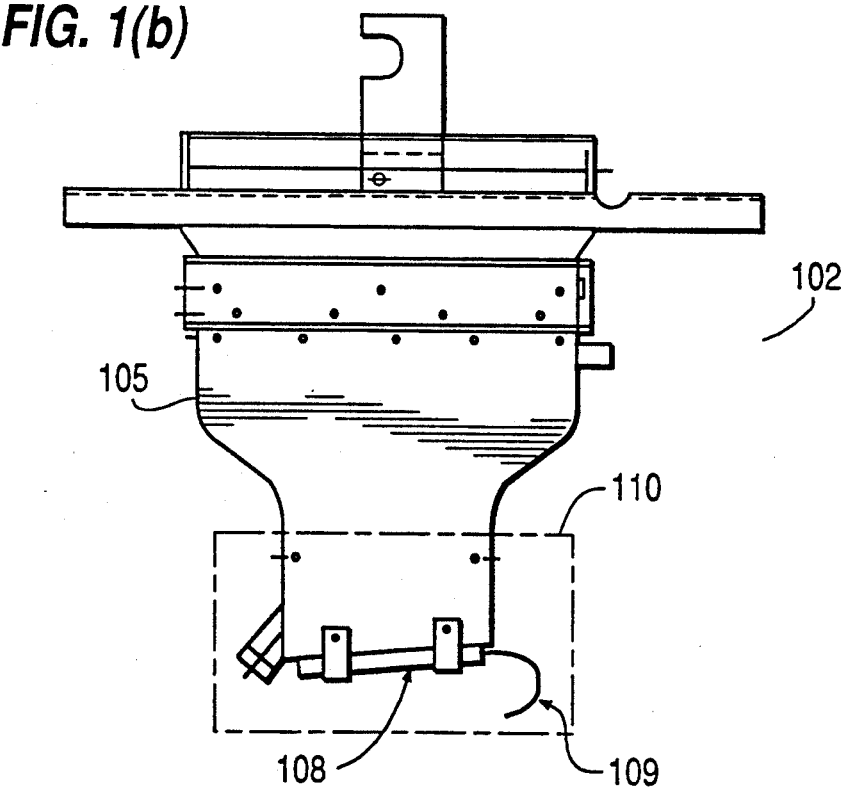

Referring to FIGS. 1(a) and 1(b), a generalized configuration is shown for one type of fryer which may be used according to a preferred embodiment of the present invention. It will be understood by one of ordinary skill in the art that the present invention, which will be described below, may be readily implemented with various other fryer types and configurations, and that the specific fryers in these figures are shown merely as a preferred embodiment and for illustration purposes. Examples of fryers suitable for use with the present invention include those fryers disclosed in U.S. Pat. No. 5,033,368, issued to Brewer and U.S. Pat. No. 4,913,038, issued to Burkett et al., both of which are commonly assigned to the present invention and both of which are hereby incorporated by reference.

Specifically, reference numeral 101 of FIG. 1(a) depicts a front view of the fryer configuration according to a preferred embodiment of the present invention, while reference numeral 102 of FIG. 1(b) depicts a side view of the same fryer. Reference numerals 104 and 105 further depict, in a front and side view respectively, the fryer as including the cooking vessel and the necessary components to receive a lid and sealing mechanisms (not specifically shown). The cooking vessel is designed such that a cooking substance (e.g. shortening, oil, fat, etc.) may be inserted into the vessel, and after the substance is heated, food products (such as breaded chicken, etc.) may be inserted into the cooking substance and deep fried.

Such a fryer is commonly known by those of ordinary skill in the art, and for purposes of a preferred embodiment, may consist of an "Eight Head Fryer" available from Henny Penny Corporation of Eaton, Ohio, the assignee of the rights in the present invention. Of course, it will be readily understood that the use of the "Eight Head Fryer" refers only to the size of the fryer, and any other size or type of fryer may just as easily be used when implementing the present invention.

In a preferred embodiment, the fryer used in the present invention may include preexisting heating device(s) to heat the cooking substance within the vessel and preexisting temperature probe(s) to detect the temperature of the cooking substance. For example, as described in U.S. Pat. No. 4,913,038, the heating device(s) may be controlled by a control circuit according to predetermined functionality. For purposes of the present invention, the operation of the control circuit with respect to the preexisting heating device(s) and temperature probe(s) is not particularly relevant, as the present invention is primarily concerned with the control of added heating device 108 and temperature probe 107 (as described below with respect to FIGS. 1(a) and 1(b)).

Reference numeral 110 of both FIGS. 1(a) and 1(b) depict the location, or zone, of the cooking vessel known as the "cold zone", which simply implies that the cooking substance within this zone commonly maintains a temperature lower than that of the cooking substance within the upper portion of the vessel. This phenomenon occurs based upon the location of the standard heating devices found within the fryer (not specifically shown in FIGS. 1(a) and 1(b)), which are not normally found in the bottom portion of the vessel. Thus, while products are being fried within the vessel during the fryer's operation, the cooking substance within "cold zone" 110 often remains at a temperature lower than the cooking substance in the upper portion of the vessel (the "warm zone").

While the existence of "cold zone" 110 within the cooking vessel normally does not cause a significant degradation in performance of the fryer, cold zone 110 does cause operational problems in certain situations. Specifically, as previously described, when cracklings (e.g. pieces of breading, skin, etc.) drop off of the food item being cooked within the cooking vessel and float down into the cold zone, the cooking substance within the vessel may have the tendency to boil over, due to the difference in temperature between the cold zone and the warm zone.

In order to circumvent this limitation, the present invention in a preferred embodiment utilizes an additional heating device and a temperature probe attached to the cooking vessel adjacent to the cold zone. As shown in FIGS. 1(a) and 1(b), heating device 108 may be attached to the outside of the vessel parallel and adjacent to the cold zone, and temperature probe 107 may be attached to the cooking vessel adjacent to the cold zone. It will be understood by one of ordinary skill in the art that the placement of heating device 108 and temperature probe 107 exactly as shown in FIGS. 1(a) and 1(b) is not necessarily mandatory. Rather, heating device 108 and temperature probe 107 need be placed in such a way so as to adequately heat and detect the temperature of the cold zone, respectively. The placement of heating device 108 and temperature probe 107 shown in FIGS. 1(a) and 1(b) comprises a preferred embodiment of the present invention.

Heating device 108 may comprise any one of various types of heating devices known in the art, such as one powered electrically or by natural gas. In a preferred embodiment, heating device 108 may consist of an electric resistive type heating device electrically connected to control circuitry via leads 109. Temperature probe 107 may comprise a 1000 ohm platinum thin film RTD, or any other commonly known type of temperature probe device, and may be connected to control circuitry via leads 106. The specific details of how heating device 108 and temperature probe 107 may be connected to the control circuitry are described below with respect to FIG. 3.

Figure 3:
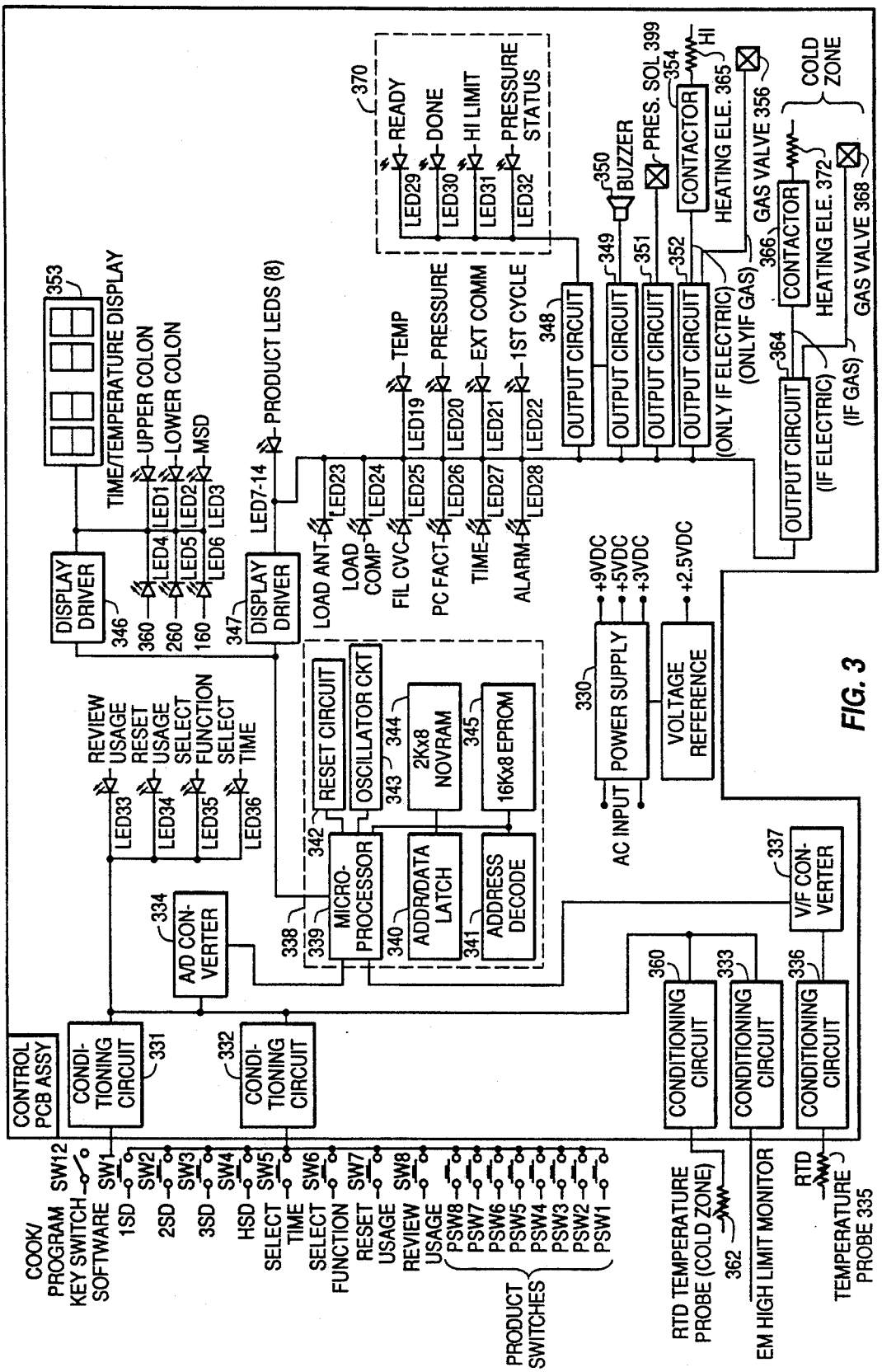
FIG. 3 is a circuit diagram for the control circuitry used with the present invention.

Referring to FIG. 3, a block diagram is shown illustrating the composition of the control circuitry according to an embodiment of the present invention. The control circuit depicted in FIG. 3 is in general the same control circuit utilized in U.S. Pat. No. 4,913,038, previously incorporated by reference, with some modifications. While the control circuit of FIG. 3 is utilized in an embodiment of the present invention, it will be appreciated by one of ordinary skill in the art that any control system capable of regulating a heating device based upon a detected temperature may be used without departing from the scope of the invention.

Element 330 refers generally to a power supply and voltage reference. The power supply may be a standard power supply with an AC input and may comprise adjustable and fixed voltage regulators to provide a plurality of output voltages—for example 9, 5 and 3 volts DC. The voltage reference may comprise an integrated circuit voltage reference with a fixed output of 2.5 volts.

Conditioning circuit 331 receives an input from SW12 and the circuit may comprise a COOK/PROGRAM software key switch conditioning circuit comprising a pull down resistor and four current limiting resistors for the REVIEW USAGE, RESET USAGE, SELECT FUNCTION, and SELECT TIME LED light bars (LEDs 33-36).

The membrane switch conditioning circuit 332 receives inputs from SW1-SW8 and product switches PSW1-PSW8 and the circuit may comprise a resistor ladder network made up of an appropriate number of resistors. SW1-SW8 and PSW1-PSW8 are used to control various functions of the control circuitry. For example, PSW1-PSW8 may be used to select cooking parameters for different types of food products to be cooked. The use for these switches is not directly related to the present invention, and therefore their use will not be described in further detail.

Electromechanical high limit monitor conditioning circuit 333 receives an input from a high limit monitor and may comprise two 1.5K dropping resistors, one H11AA1 optoisolator, a pull down resistor and a noise filter capacitor. The use of high limit circuits is known to one of ordinary skill in the art and will not be elaborated upon.

The A/D converter 334 comprises an ADC0811C IC converter and a bypass capacitor and receives inputs from conditioning circuits 331, 332, 360 and 333.

Temperature probe 335 may comprise a 1000 ohm platinum thin film RTD and provides an input to its conditioning circuit 336 which may comprise a voltage divider and a capacitor for noise control. The output of conditioning circuit 336 provides an input to V/F converter 337 which may comprise an AD654 IC converter and resistor, potentiometer and capacitor to set the full scale output frequency. The converters 334 and 337 provide inputs to microprocessor 339 which is discussed below.

As indicated by the hatched box 338, the central processing unit (CPU) core comprises an MC6803 microprocessor indicated as reference numeral 339, a 74LS373 address/data latch indicated by reference numeral 340, a 74LS139 one-of-four address decoder indicated by reference numeral 341, a reset circuit 342, an oscillator circuit 343, a 2K×8 NOVRAM (48Z02) indicated by reference numeral 344 for storing cooking parameter data, and a 16K×8 EPROM (27C128) indicated generally as 345 that contains the program for the control. One function of decoder 341 is to generate enable signals for elements 344 and 345.

Reset circuit 342 comprises two resistors forming a voltage divider of the 9-volt supply, an amplifier (in an LM224 quad op amp package) wired as a comparator, a MOSFET (VLN2222), a reset resistor and capacitor, and three diodes (1N914) and a resistor for switching the reset mode select voltages. Oscillator circuit 343 may comprise a 4.000 MHz crystal and two compensation capacitors. The operation of the CPU core will be readily apparent to one of ordinary skill in the art and will not be described further.

Display drivers 346 and 347 each comprise a MM5450 IC driver, and a resistor and capacitor to set output current limiting.

Output circuit 348 may comprise a 10K resistor DIP and a ULN2003 IC buffer. Output circuit 349 is a buzzer output circuit which may comprise a switching transistor (2N3904) three diodes to bias the transistor, and a diode (1N914) to increase the volume of the buzzer. Element 350 indicates a buzzer which may be used to indicate an alarm or provide other signals to an operator. Output circuits 351 and 352 comprise MOC3041 triac drivers, current limiting resistors, a MAC3040 triac, pull up resistors and a snubber network formed of a resistor and capacitor.

Display 353 is a time/temperature display. The various LEDs (LED 1-LED 36) corresponds to the displays and indicators described in U.S. Pat. No. 4,913,038, which are not directly relevant to the present invention, but are included in the present discussion for completeness.

Output circuit 351, responsive to the operation of CPU 338, may be used to activate a pressure solenoid 399 to turn on or turn off during the cook operation to selectively enable a user to cook with or without pressure. Output circuit 352 also responsive to CPU 338 may have two outputs one of which may be used if an electrical heating device is used and the other used if a gas heating device is used. With an electrical heating device, the output of output circuit 352 is used to control a contactor 354 which operates heating device 355. If a gas heating device is used, the output of output circuit 352 is used to control the operation of gas valve 356. The use herein of the terms heating device will be understood to cover either gas or electric heating devices unless otherwise specified.

The components of the control circuit depicted in FIG. 3 and described thus far represent a control assembly generally known in the art as exemplified in U.S. Pat. No. 4,913,038. It will be understood that the components described above represent only a preferred embodiment of a control circuit utilized in the present invention, and that other suitable control circuits may just as easily be utilized. Certain components depicted in FIG. 3, which are described below, comprise the elements of the present invention which are not found in the prior art.

Specifically, temperature probe 362, like temperature probe 335, may comprise a 1000 ohm platinum thin film RTD, and provides an input to conditioning circuit 360, which may comprise a voltage divider and a capacitor for noise control. Conditioning circuit 360 may be constructed in a preferred embodiment similar to conditioning circuit 336, described previously. Conditioning circuit 360 provides the temperature read by temperature probe 362 to A/D converter 334, which in turns provides this signal to microprocessor 339.

Output circuit 364, like output circuits 351 and 352, comprise a MOC3041 triac driver, current limiting resistors, a MAC3040 triac, pull up resistors and a snubber network formed of a resistor and capacitor. Like output circuit 352, output circuit 364 is also responsive to CPU 338 and may have two outputs one of which may be used if an electrical heating device is used and the other used if a gas heating device is used. With an electrical heating device, the output of output circuit 364 is used to control a contactor 366 which operates heating device 372. If a gas heating device is used, the output of output circuit 364 is used to control the operation of gas valve 368. Heating device 372 and/or gas valve 368 may comprise any one of a variety of commonly available components and may be configured by widely known means to operate as heating device(s) for purposes of the present invention.

In a preferred embodiment, temperature probe 362 may be attached to the cooking vessel as depicted in FIG. 1(a) as element 107. In other words, temperature probe 107 shown in FIG. 1(a) is the same as temperature probe 362 shown in FIG. 3. Likewise, either or both heating device 372 and/or gas valve 368 is the same as heating device 108 in FIG. 1(b). Both temperature probe 362 and heating device(s) 372 and/or 368 are thereby placed within the cold zone of the cooking vessel, and the operation of CPU 338 with respect to these two elements will now be described.

Figure 2:
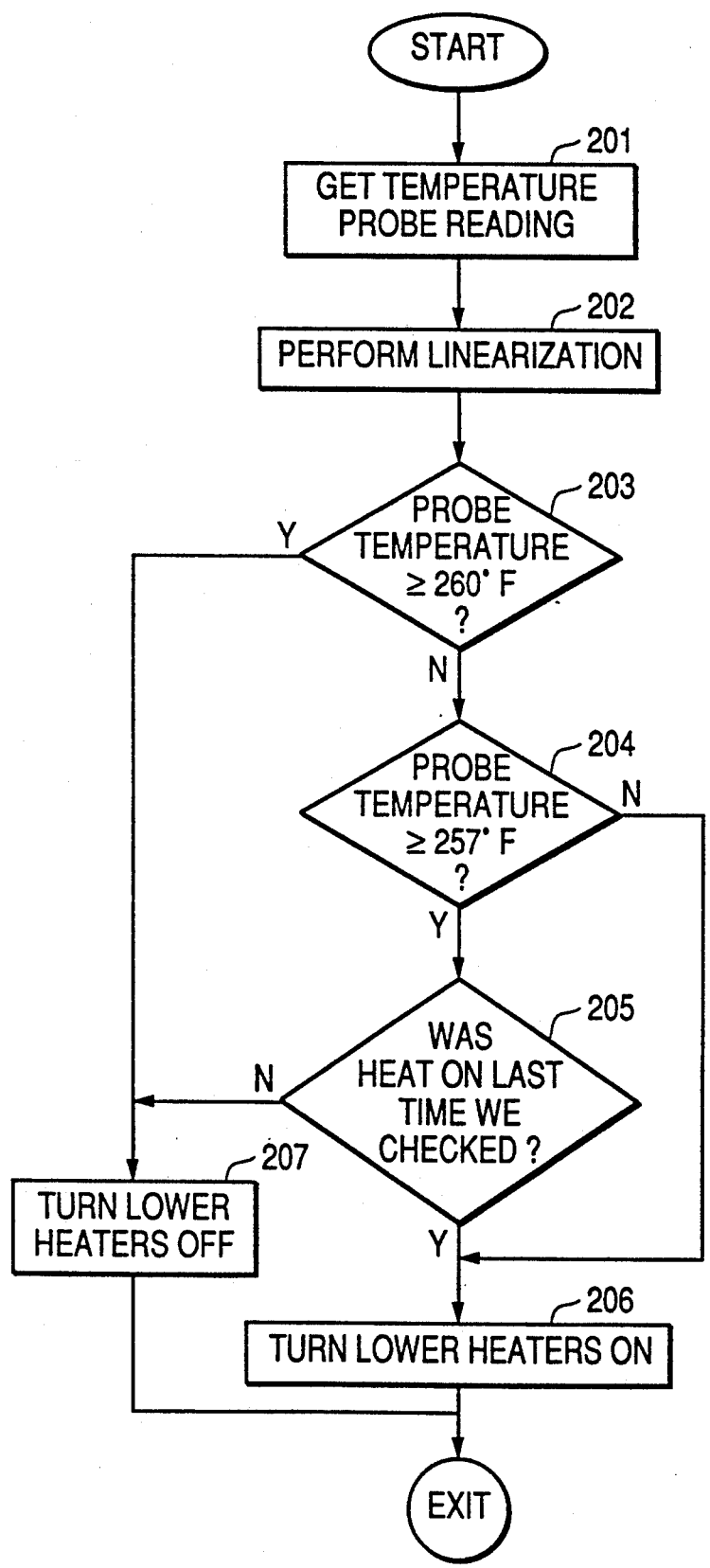
FIG. 2 is a flow diagram illustrating the process which is performed in accordance with the present invention.

A flow diagram depicting the operation of the present invention is shown in FIG. 2. The operations performed in the various steps of this flow diagram are performed by the control circuitry of the fryer (as shown in FIG. 3 and described in detail below) in conjunction with heating device 108 and temperature probe 107 (FIG. 1). Basically, the control circuitry detects the temperature measured by temperature probe 107 and adjusts heating device 108 accordingly.

Referring to FIG. 2, step 201, "Get Temperature Probe Reading", is first executed in order to ascertain the temperature within the cold zone of the cooking vessel. Step 201 is executed after the heating device of the "warm zone" of the fryer (elements 354 and/or 356 of FIG. 3) is activated to allow for normal operation of the fryer. For example, the control sequence described in U.S. Pat. No. 4,913,038 for operating a fryer may be utilized.

Step 210 consists of reading the temperature within the cold zone from temperature probe 362 via conditioning circuit 360 and A/D converter 334 (FIG. 3). This operation is performed under control of CPU 338. Thereafter, the temperature obtained in step 201 is "linearized" in step 202 so as to convert the temperature into "degrees Fahrenheit". In a preferred embodiment, the temperature reading detected by probe 362 in step 201 must be divided by 16 in order to be transformed into Fahrenheit degrees, and then must be offset by a value of 180 in order to arrive at the proper Fahrenheit temperature. However, it will be readily understood that other types of temperature probes substituted for temperature probe 362 might require other conversion and linearization functions to be performed in order to arrive at the proper temperature designation.

After the temperature of the cold zone is determined in steps 201 and 202, this temperature is compared with a target temperature, which in the preferred embodiment is 260 degrees Fahrenheit (F.). 260 degrees F. has been determined to be the best temperature at which to maintain the cold zone in a preferred embodiment in order to minimize boiling over of the cooking substance in the cooking vessel. However, it will be understood that this target temperature is disclosed only as the best known temperature of reducing boil over; in other fryer configurations and types, different target temperatures may be utilized in order to achieve a desired result. For example, trial and error may simply be used in order to arrive at an appropriate target temperature.

Next, step 203 is executed which compares the cold zone temperature measured and linearized in steps 201 and 202 with the target temperature (e.g., 260 degrees F.). If the cold zone temperature is determined to be greater than or equal to 260 degrees F., steps 204-206 are bypassed and instead step 207 is executed. Step 207 involves turning the lower heater(s) (e.g., heating device 372 and/or gas value 368) off in the cold zone (deactivating the cold zone heater(s)). This step is included so that, if the temperature of the cold zone is greater than the target temperature, the cold zone heater(s) will be turned off so that no more heat is applied to this portion of the cooking vessel.

If, on the other hand, the cold zone temperature is determined to be less than the target temperature of 260 degrees F., step 204 is executed. Step 204 consists of determining whether the temperature measured by temperature probe 362 is greater than or equal to than 257 degree F. If the temperature of the cold zone is less than 257 degrees F., step 205 is bypassed and step 206 is reached, which turns the cold zone heater(s) on (activates the cold zone heater(s)). If the temperature of the cold zone is greater than or equal to 257 degrees, step 205 is executed.

Step 205 consists of determining whether the heat applied to the cold zone was activated during the last execution through the steps of FIG. 2. If the cold zone heater(s) were on previously, step 206 is executed which turns the lower heater(s) on. If the cold zone heater(s) were not on previously, step 207 is executed, which turns the cold zone heater(s) off. The purpose of providing step 205 among the various steps executed is to provided "hysteresis" to the heater control system of the present invention. Specifically, hysteresis provides a method of preventing the constant switching of the cold zone heater(s) on and off as the temperature of the cold zone rises above and falls below the target temperature.

For purposes of the present invention, step 205 provided hysteresis by allowing the cold zone heaters to be turned on only when the temperature rises to greater than or equal to 260 degrees Fahrenheit (F.) and turning off the cold zone heaters only when the temperature falls to less than 257 degrees F. Thus, while the temperature of the cold zone is greater than or equal to 257 degrees F. and less than 260 degrees F., the cold zone heater(s) retain their previous status, and only are turned on or off as described above. This allows for less periodic switching activity of the heaters while still regulating the temperature of the cold zone within the specified range.

Finally, after either step 206 or 207 is executed, the control steps are completed, and the process may be repeated indefinitely to allow for proper control of the cold zone heater(s). It will be understood by one of ordinary skill in the art that steps 201-207 of FIG. 2 may be readily implemented in conjunction with the particular control system being used with the fryer. For example, when a microprocessor is used, as in a preferred embodiment of the present invention, appropriate machine language instructions applicable for the specific microprocessor may be easily developed according to commonly known programming practices to execute the various steps of FIG. 2.

The preceding is a description of the preferred embodiments of the present invention. However, various modifications will be apparent to one of ordinary skill in the art without departing from the scope and spirit of the invention. The scope of the invention is only to be limited by the appended claims.

We claim:

1. In a deep fat fryer comprising a cooking vessel for holding a cooking substance, a first temperature probe for sensing a first temperature of said cooking substance in a first zone of said vessel, a first heating device for heating said cooking substance in said first zone of said vessel, and a heating device control for controlling said first heating device responsive to said first temperature probe, an apparatus for regulating the temperature of said cooking substance in a second zone of said vessel, said temperature regulation apparatus comprising:
   a second temperature probe for sensing a second temperature of said cooking substance in a cold zone of said deep fat fryer, and
   a second heating device located adjacent said cold zone for heating said cooking substance in said second zone of said vessel, wherein said heating device control controls said second heating device responsive to said second temperature of said cooking substance in said second zone to a predetermined target temperature range.

2. The temperature regulation apparatus of claim 1, wherein said cooking vessel comprises a deep fat fryer.

3. The temperature regulation apparatus of claim 1, wherein said second temperature probe is located adjacent to said second zone.

4. The temperature regulation apparatus of claim 1, wherein said second temperature probe comprises a temperature measuring resistor.

5. The temperature regulation apparatus of claim 1, wherein said second heating device is located adjacent to said second zone.

6. The temperature regulation apparatus of claim 1, wherein said second heating device comprises an electric heating device.

7. The temperature regulation apparatus of claim 1, wherein said second heating device comprises a gas heating device.

8. The temperature regulation apparatus of claim 1, wherein said heating device control comprises a central processing unit.

9. The temperature regulation apparatus of claim 1, wherein said predetermined target temperature range is equal to 260 degrees Fahrenheit.

10. The temperature regulation apparatus of claim 1, wherein said predetermined target temperature range is greater than or equal to 257 degrees Fahrenheit and less than 260 degrees Fahrenheit.

11. In a deep fat fryer comprising a cooking vessel for holding a cooking substance, a first temperature probe for sensing a first temperature of said cooking substance in a first zone of said vessel, a first heating device for heating said cooking substance in said first zone of said vessel, and a heating device control for controlling said first heating device responsive to said first temperature probe, a method of regulating the temperature of said cooking substance in a second zone of said vessel, said temperature regulation method comprising:
   (a) sensing a second temperature of said cooking substance in a cold zone of said deep fat fryer,
   (b) providing a second heating device adjacent said cold zone, and
   (c) heating said cooking substance in said second zone responsive to said sensed second temperature to regulae the temperature of said cooking substance in said second zone to a predetermined target temperature range.

12. The temperature regulation method of claim 11, wherein step (a) further comprises the steps of:
   (i) reading said second temperature from a second temperature probe located adjacent to said second zone,
   (ii) linearizing said second temperature into degrees Fahrenheit.

13. The temperature regulation method of claim 11, wherein said predetermined target temperature range consists of a first target temperature and a second target temperature, said first target temperature being greater than said second target temperature.

14. The temperature regulation method of claim 13, wherein step (b) further comprises the steps of:
   (i) comparing said second temperature to said first target temperature,
   (ii) deactivating a second heating device located adjacent to said second zone if said second temperature is greater than or equal to said target temperature,
   (iii) activating said second heating device if said second temperature is less than said second target temperature, and
   (iv) maintaining said second heating device in its present activated/deactivated state if said second temperature is greater than or equal to said second target temperature.

15. The temperature regulation method of claim 14, wherein said first temperature equals 260 degrees Fahrenheit.

16. The temperature regulation method of claim 14, wherein said second target temperature equals 257 degrees Fahrenheit.

* * * * *